(12) United States Patent
Casaro

(10) Patent No.: US 7,553,123 B2
(45) Date of Patent: Jun. 30, 2009

(54) ANNULAR SUPPORT FOR ROLLING BEARINGS

(75) Inventor: Fausto Casaro, Turin (IT)

(73) Assignee: Varian, S.p.A., Leini, Torino (IT)

( * ) Notice: Subject to any disclaimer, the term of this patent is extended or adjusted under 35 U.S.C. 154(b) by 602 days.

(21) Appl. No.: 11/184,279

(22) Filed: Jul. 19, 2005

(65) Prior Publication Data

US 2006/0018774 A1 Jan. 26, 2006

(30) Foreign Application Priority Data

Jul. 20, 2004 (EP) .................................. 04103444

(51) Int. Cl.
*F03B 11/06* (2006.01)
(52) U.S. Cl. ..................... 415/90; 415/229; 384/536
(58) Field of Classification Search .................. 415/90, 415/119, 229; 417/423.4; 384/99, 535, 536, 384/581, 582
See application file for complete search history.

(56) References Cited

U.S. PATENT DOCUMENTS

| | | | | | |
|---|---|---|---|---|---|
| 1,080,649 | A | * | 12/1913 | Morgan | 152/80 |
| 1,509,982 | A | * | 9/1924 | Schoeneck et al. | 301/67 |
| 1,522,315 | A | * | 1/1925 | Nash | 152/82 |
| 1,625,518 | A | * | 4/1927 | Beisel | 152/85 |
| 1,639,827 | A | * | 8/1927 | Wayne | 152/6 |
| 1,858,723 | A | * | 5/1932 | Weaver | 152/86 |
| 3,325,230 | A | * | 6/1967 | Caunt | |
| 3,385,543 | A | * | 5/1968 | Werner et al. | 384/582 |
| 3,743,365 | A | * | 7/1973 | Kato | 384/536 |
| 3,950,964 | A | * | 4/1976 | Alexeeva et al. | |
| 4,325,650 | A | * | 4/1982 | Masai | |
| 4,422,780 | A | * | 12/1983 | Glaeser | 384/215 |
| 4,553,577 | A | * | 11/1985 | Gregg | 152/12 |
| 4,872,767 | A | * | 10/1989 | Knapp | |
| 5,314,255 | A | * | 5/1994 | Schwerdt | 384/536 |
| 5,425,584 | A | * | 6/1995 | Ide | 384/99 |
| 5,971,908 | A | * | 10/1999 | Scheuber et al. | 494/84 |
| 5,977,677 | A | * | 11/1999 | Henry et al. | |
| 6,102,577 | A | * | 8/2000 | Tremaine | 384/493 |
| 6,131,914 | A | * | 10/2000 | Proveaux | 277/412 |
| 6,224,533 | B1 | * | 5/2001 | Bengtsson et al. | 494/82 |
| 6,480,363 | B1 | * | 11/2002 | Prater | 360/265.7 |
| 6,615,885 | B1 | * | 9/2003 | Ohm | 152/11 |
| 6,617,733 | B1 | * | 9/2003 | Yamauchi et al. | 310/90.5 |

FOREIGN PATENT DOCUMENTS

FR 2789459 A1 * 8/2000

* cited by examiner

*Primary Examiner*—Edward Look
*Assistant Examiner*—Aaron R Eastman
(74) *Attorney, Agent, or Firm*—Bella Fishman

(57) ABSTRACT

A support ring (1) for rolling bearings (11), especially for rolling bearings applied to rotors with very high rotation speed, such as rotors of rotary vacuum pumps, the ring comprising a pair of concentric cylindrical shells (3, 5) connected together by a plurality of oblique radial plates (9), at least one of said shells (3, 5) being circumferentially broken so as to define a plurality of shoes (7), each shoe being connected to at least one of the radial plates (9) in such a manner as to define shoe portions or arcs ($A_1$, $A_2$) of different length, wherein the plates (9) are resilient and allow for the radial displacement of the shoes (7) so as to restrain vibrations of the rotating portion.

15 Claims, 5 Drawing Sheets

ANNULAR SUPPORT FOR ROLLING BEARINGS

BACKGROUND OF THE INVENTION

The present invention relates to an annular support for rolling bearings.

As known, rolling bearings are mechanical devices in which a relative motion, for instance between a rotating member and a stationary member (or between a pair of members rotating at different speeds), takes places with the interposition of balls or rollers rolling between two tracks, one of which is directly formed on the rotating member or a ring integral therewith, and the other is formed on the stationary member or a second ring integral therewith. The balls or rollers are generally spaced by a variously shaped cage, capable of separating and holding the balls or rollers.

In some industrial applications, a resilient support is to be interposed between the bearings and the seat housing them, or between the bearings and the rotating member, e.g. a shaft. The resilient support is to compensate an alignment error, if any, of the same bearings and to prevent vibrations, generated also due to the alignment error, from propagating from the shaft to the structure of the machine in which the shaft is mounted.

Another source of shaft vibrations is a non-uniform mass distribution about the geometrical rotation axis, resulting in centrifugal forces in the rotor and hence in the bearings thereof. One of the applications where use of resilient support is generally provided for concerns rotary vacuum pumps, more particularly turbomolecular vacuum pumps of the kind equipped with mechanical bearings.

As known, rotary vacuum pumps are equipped with rotating shafts supported either by magnetic bearings or by mechanical rolling bearings, in which the shaft rotates at extremely high speed, typically in the range 20,000 to 90,000 rpm.

When the pump is equipped with mechanical bearings, in order to prevent vibrations of the shaft or the pumping rotor associated therewith from propagating to the pump structure, annular supports of elastomeric material are provided, which surround the rolling bearings.

FIG. 1 shows an example of turbomolecular pump in which a rotor 101 is equipped with rotor discs 103 that, by co-operating with stationary stator discs integral with the pump housing (not shown), provide for gas pumping between the inlet port and the discharge port of the pump.

The rotor 101 is mounted onto a rotating shaft 105 supported by ball bearings 107a, 107b. The rotating shaft 105 is rotated by an electric motor 109 housed within a cavity 111 formed in pump basement 117.

As clearly shown in the enlarged portion of FIG. 1, a resilient annular support 113, made of one or more rings, is provided between each ball bearing 107a, 107b and the corresponding seat 115 formed in pump basement 117.

The provision of annular supports 113 is due above all to the need to damp vibrations transmitted by the rotating portions of the pump to the body of the same pump and, through the pump, to the vacuum chamber.

Actually, in some particularly critical applications (such as in mass spectrometry), where the vacuum pump is used in association with very sophisticated measurement instruments, it is indispensable to prevent the vibrations of the pump rotor from being transmitted to the remaining structure and in particular to the instruments.

A direct consequence of the damping of these vibrations is moreover the reduction of the overall pump noise.

The presence of annular supports 113 also contributes to a considerable reduction of the first critical speed (intended as the first rotation speed associated with a modal form with substantially non-deformed rotor—"rigid rotor"—and at which the force transmitted to the bearings has a maximum), which in this manner is far lower than the nominal pump rotation speed, with a resulting effect of rotor self-balancing when critical speed is exceeded.

Further, the presence of such annular supports allows compensating any alignment error depending on the mechanical working of the bearing seats: said alignment errors are sometimes considerable and exceed the limits recommended by the manufacturers for high-speed precision bearings, used for instance in turbomolecular pumps.

According to the prior art, said annular supports are resilient and they are preferably made of an elastomeric material, such as nitrile rubber. Yet, using elastomeric supports entails a number of drawbacks.

For example, in these supports the mechanical characteristics of the material are dispersed, it is practically impossible therefore to attain uniform mechanical while different ring points exhibit different rigidity. For the same reason, it is infeasible to manufacture several rings of elastomeric material all exhibiting the same mechanical properties as well to predict their behaviour at the design phase.

Moreover, the properties of the elastomeric material become degraded in time, due to the applied loads and the operating temperature (often exceeding 60° C.), with resulting loss of resiliency and permanent deformation of the support. Such loss of resiliency has, among other drawbacks, severe consequences on the balancing of the rotor that, being no longer correctly held in radial direction, transmits stronger vibrations to the pump body.

It is also to be considered that, for the kind of use described above, elastomeric rings would require considerable geometric precision (in respect of diameter sizes, diameter concentricity etc.), which is extremely difficult to attain with such materials.

Further, it should be taken into account that ball bearings mounted in vacuum pumps are generally submitted to an axial preload. For instance, in the case shown in FIG. 1, the preload is exerted by spring 119. The considerable axial friction existing between the outer ring of the ball bearing and the elastomeric annular support may significantly hinder the proper application of this preload, especially as concerns bearing 107 a farther from the preload spring 119 arranged in the pump basement.

In order to by-pass the latter problem, it has been proposed to introduce metal inserts into the elastomeric annular support, in correspondence of the inner wall of the annular support, or to submit the inner wall to surface treatments also intended to reduce the friction thereof.

Such a solution, while reducing the axial friction between the diametrical bearing surface and the support ring, does not allow however for eliminating the previously mentioned drawbacks related to the lack of homogeneity and the wear-induced degradation of the mechanical properties of the elastomeric materials.

Moreover, this manner of operating also causes a reduction of the tangential friction, which should instead be kept high to prevent the outer ring of the bearing from rotating relative to the annular support.

It has therefore been proposed in the past to replace the elastomeric rings by metal rings obtained for instance from an undulated ribbon.

The performance of such rings is generally higher than that of elastomeric rings. The undulated shape actually confers resiliency to said metal rings, the mechanical characteristics thereof are uniform and constant in time, and the metal hardness considerably reduces axial friction with the cylindrical surface of the bearing ring to which they are applied.

Examples of such metal support rings are disclosed in FR 2,789,459, U.S. Pat. No. 5,977,677 and U.S. Pat. No. 6,617,733.

Yet, such solutions are not free from drawbacks, the main of which is due to the fact that the configuration of the ring, obtained for instance from a shaped metal ribbon, has a contact surface with the bearing that is not oriented relative to the rotation direction of the rotating portion.

This configuration has the drawback of considerably reducing also the tangential friction between the ring of the bearing and the support, which friction on the contrary must be sufficiently high to prevent the outer ring of the bearing, to which the support is applied, from rotating relative to the same support.

SUMMARY OF THE INVENTION

It is therefore the main object of the present invention to overcome the above drawbacks, by providing an annular support for rolling bearings, which is capable of effectively restraining the vibrations transmitted by the bearing or rotating shaft the support is associated with, and which exhibits a reduced axial friction and a considerable tangential friction with the surface of the ring of said bearing or of said shaft.

The above and other objects are achieved by the support ring as claimed in the appended claims.

Thanks to the provision of the plates joining the inner and outer cylindrical shells and acting as resilient members, vibrations can be effectively restrained.

Advantageously, by interposing one or more pads, for instance made of silicone rubber, between the resilient plates of the support, the damping support action can be increased.

Some preferred embodiments of the invention, given by way of non-limiting examples, will be described hereinbelow with reference to the accompanying drawings, in which:

DETAILED DESCRIPTION OF THE INVENTION

Figure 1:
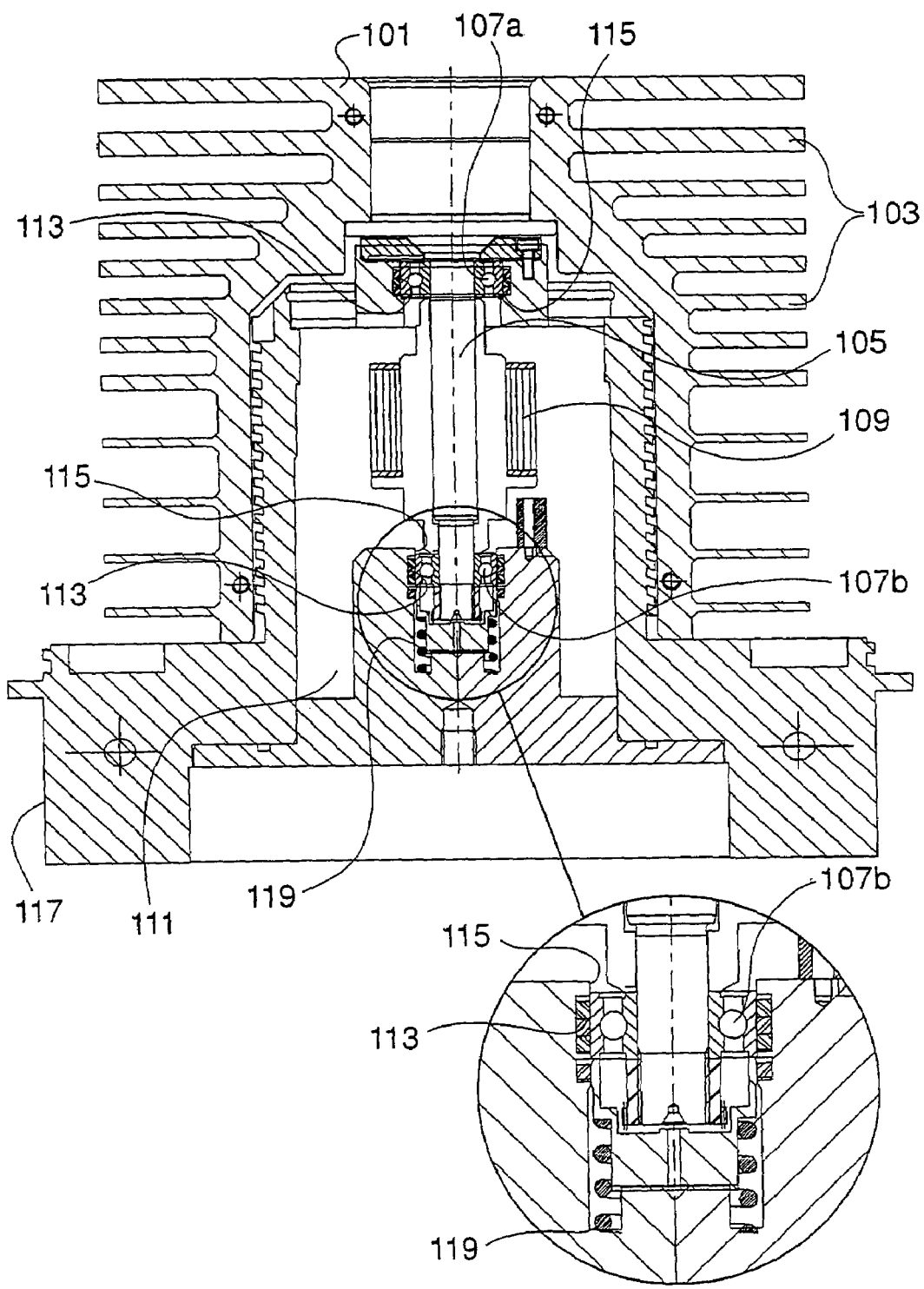
FIG. 1 is a cross-sectional view of a first example of a prior art turbomolecular pump.
Figure 2:
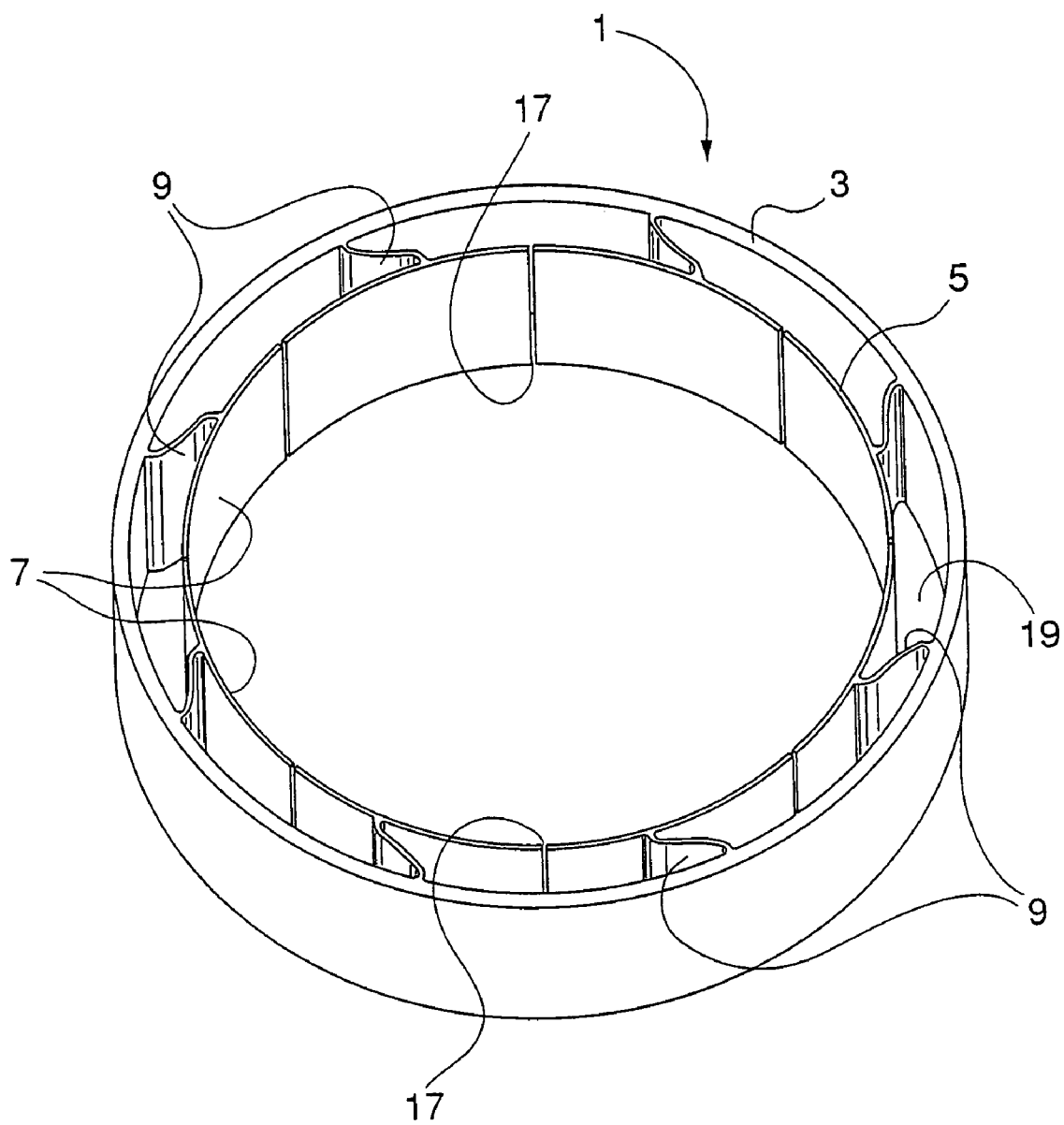
FIG. 2 is a perspective view of the support according to the invention, in a preferred embodiment.

Referring to FIG. 2, there is shown a support ring 1 according to a preferred embodiment of the invention, comprising an outer cylindrical shell 3 and an inner cylindrical shell 5, connected together by a plurality of plates 9.

In this embodiment, inner shell 5 is broken by a plurality of slits 17 formed along corresponding generatrices, preferably equally spaced, so as to define a plurality of shoes 7, each connected to outer shell 3 by means of a corresponding plate 9.

Advantageously, the plates 9 are resilient, so that they allow a resilient radial displacement of shoes 7 and, consequently, prevent vibrations from radially propagating from the inside towards the outside through support 1.

Moreover the plates 9 are preferably obliquely arranged relative to the shells 3, 5, on planes parallel to the generatrices of these shells, and are formed with a curved shape, substantially an "S" shape.

In the embodiment shown in FIG. 2, support 1 has been made with a solid outer shell 3 and a broken inner shell 5; yet it is also possible to make a support 1 in which inner shell 5 is solid and outer shell 3 is broken, while keeping substantially the same arrangement of plates 9 and shoes 7, which, in such case, will be distributed along outer shell 3 of annular support 1.

Figure 3A:
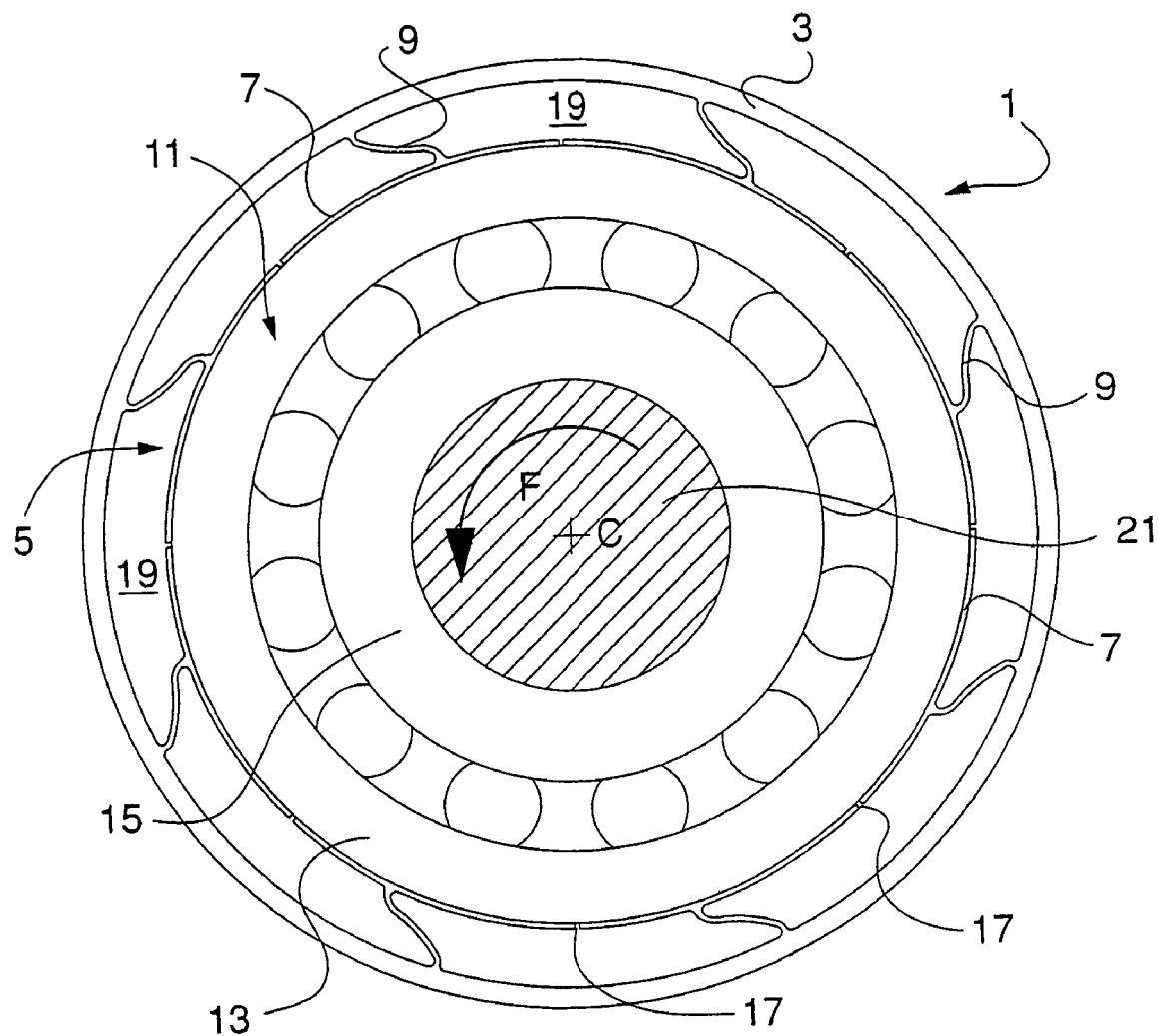
FIGS. 3a and 3b are plan views of two mounting arrangements of the support shown in FIG. 2.

Turning now to FIG. 3a, annular support 1 is shown with a ball bearing 11 mounted inside it.

Advantageously, support 1 is wholly made of metal, preferably with high hardness such as AISI440 steel tempered to hardness 48-50 HRC (Rockwell Hardness Scale).

Since also outer ring 13 of bearing 11 is generally made of a metal with high hardness (58-60 HRC), the friction coefficient in axial direction between said ring 13 and shoes 7 is greatly reduced.

It is to be appreciated that, due to the particular geometry of annular support 1, the friction in tangential direction is instead advantageously very high.

Because of the particular oblique arrangement of plates 9, and also because of the "S" shape thereof, should ring 13 of bearing 11 be driven into rotation by the motion of shaft 21 in the direction denoted by arrow F, shoes 7 will tend to become blocked against ring 13, thereby hindering the rotation of said outer ring 13 of bearing 11.

Tempering the steel used for manufacturing annular support 1 results in a material with optimum mechanical properties, especially with a high fatigue resistance. Such a characteristic is of paramount importance, since plates 9 vibrate at the rotation frequency of shaft 21 onto which bearing 11 is mounted, which frequency, in case of a turbomolecular vacuum pump, is usually high (330-1500 Hz).

Advantageously moreover bearing 11 is inserted into support ring 1 with diametrical interference, so that the fatigue cycles are pulsating cycles, which are less harmful with respect to the "zero pulsating" cycles that would be attained without geometrical interference between bearing and ring.

It is to be appreciated that the mechanical characteristics of annular support 1 can be varied, by substantially operating on the thicknesses of outer and inner shells 3, 5, the number, the arrangement and the thicknesses of plates 9 and the number of shoes 7.

Once those parameters have been set, the mechanical characteristics of annular support 1 are determined with high precision, they are homogenous and constant in time and they can be reproduced identically on a great number of rings in an industrial mass production.

Specifically, the stiffness of annular support 1 can be determined with extremely high precision by forming shoes 7 from a solid cylindrical ring and by creating axial openings 19 and slits 17 by wire electrical discharge machining.

As far as the resiliency of annular support 1 is concerned, plates 9 act as springs, transmitted by shaft 21.

However, if its is desired to further increase the resilient properties of annular support 1, openings 19 defined by shells 3 and 5 and plates 9 could also be filled with an elastomeric material, such as rubber or a silicone compound.

In this respect it is to be appreciated that, since such material would not come into contact with outer ring 13 of bearing 11, the axial friction between such ring 13 and annular support 1 would not be altered.

Figure 4:
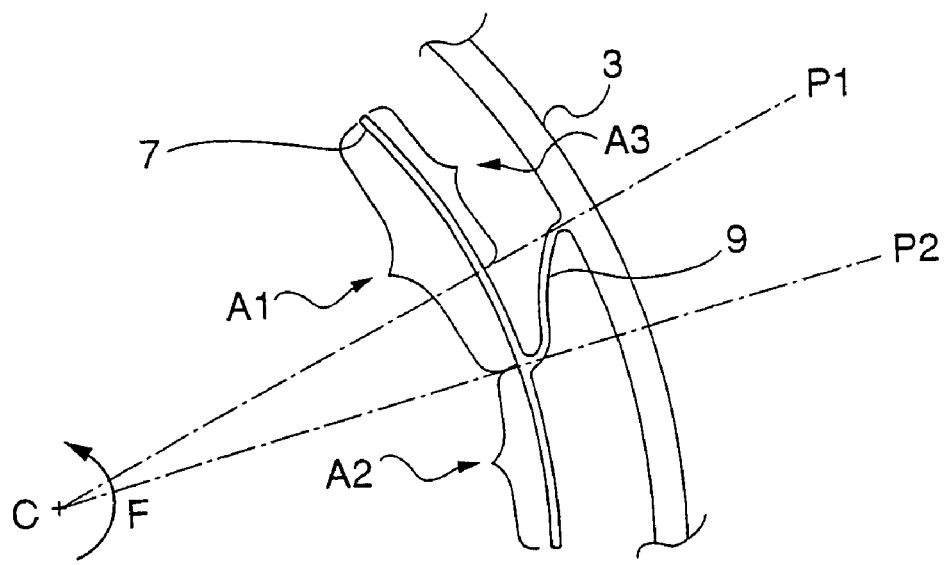
FIG. 4 is an enlarged detail of FIG. 3a or 3b.

As better shown in FIG. 4, each plate 9 is connected to a respective shoe 7 along a generatrix lying in a region intermediate slits 17 provided in said inner shell 5. Due to the oblique arrangement of plates 9, said plates are connected to said outer shell 3 and said inner shell 5 along generatrices lying in different planes, $P_1$ and $P_2$ respectively, passing through central axis C of annular support 1.

Preferably, each plate 9 is connected to the corresponding shoe 7 along a generatrix chosen so as to define corresponding shoe portions $A_1$ and $A_2$ oriented relative to the rotation direction of shaft 21, denoted by arrow F.

Moreover, according to the invention, it is advantageous to arrange the connection region between a plate 9 and the corresponding shoe 7 so that the shoe arc denoted by reference $A_1$, which extends from said region in the same direction as rotation direction of shaft 21, has greater length than shoe arc $A_2$ extending in opposite direction to the rotation direction of said shaft 21.

Further in accordance with a preferred embodiment of the invention, plane $P_1$ crosses the corresponding shoe 7 so that the length of shoe arc $A_3$, which extends from said crossing line in the same direction as rotation direction of shaft 21, is substantially the same as that of shoe arc $A_2$.

This is achieved because bearing 11 is mounted with interference inside annular support 1 and thus, at the application, the radial pressure exerted by bearing 11 can cause a slight rotation of shoes 7. Should plates 9 be connected at the centre of shoes 7, such rotational movement would result in a loss of adherence between shoes 7 and outer ring 13 of bearing 11 at the connection point between the plate and the shoe. On the contrary, by connecting plates 9 to shoe 7 in an offset connection point, that is along a generatrix not centred with respect to the shoe ends, it is possible to increase the contact between shoe 7 and outer ring 13 of bearing 11, in particular in a neighbourhood of said generatrix where the resilient force exerted by plate 9 is applied.

Advantageously, due to the structure with shoes and resilient plates, the support according to the present invention has a high friction in tangential direction, whereas the friction in axial direction is considerably reduced.

According to the present invention, the annular support described above could be used not only between the bearing seat and the bearing, as shown in FIG. 3a, but also between the bearing and a possible stationary shaft (for instance in a turbomolecular pump), in which case the outer bearing ring will be a rotating ring.

Figure 3B:
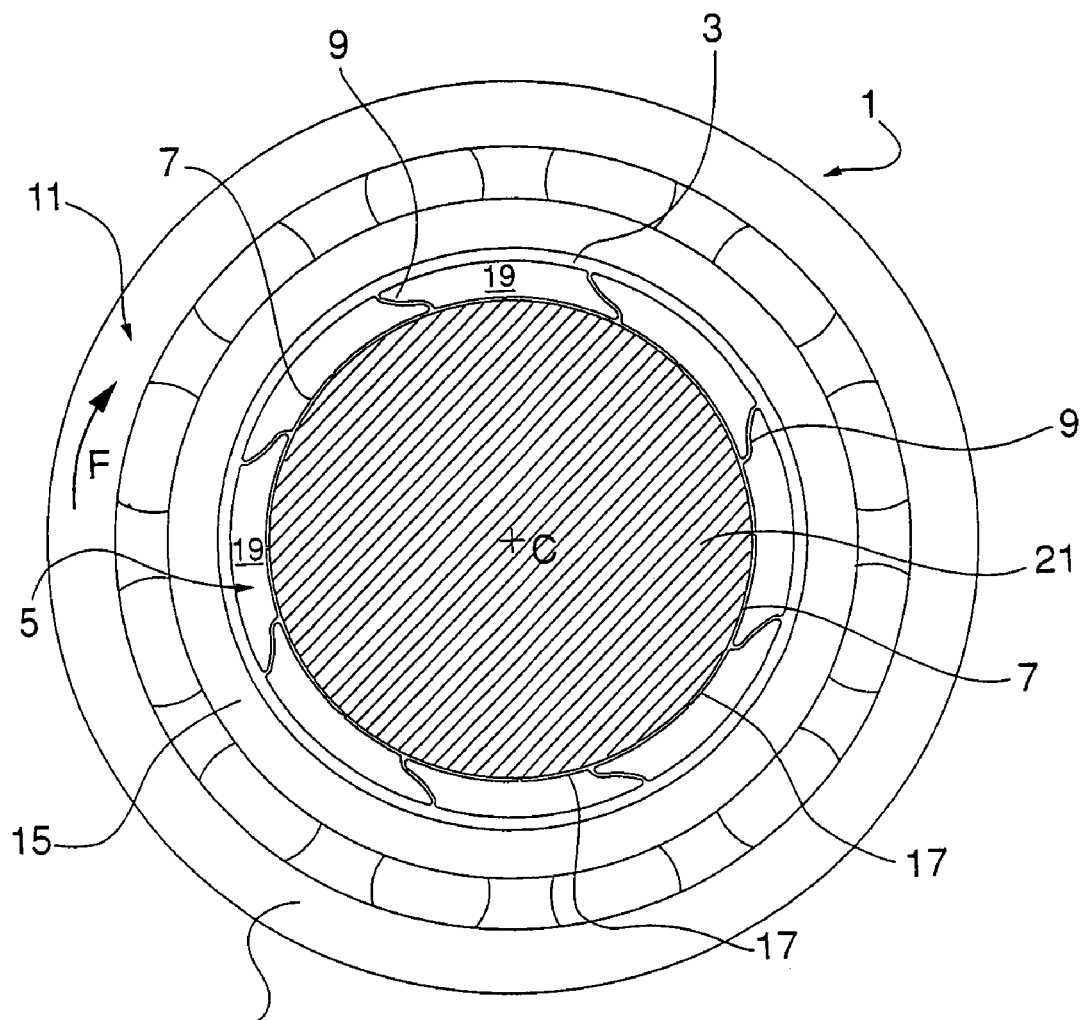

FIG. 3b shows a mounting arrangement for ring 1 in which bearing 11 is applied outside annular support 1 and this support is placed directly in contact with shaft 21. Still with reference to that mounting arrangement, it is to be appreciated that outer shell 3 can be advantageously integrated into inner ring 15 of the bearing, and support 1 can thus form an integral body with bearing 11.

Figure 3C:
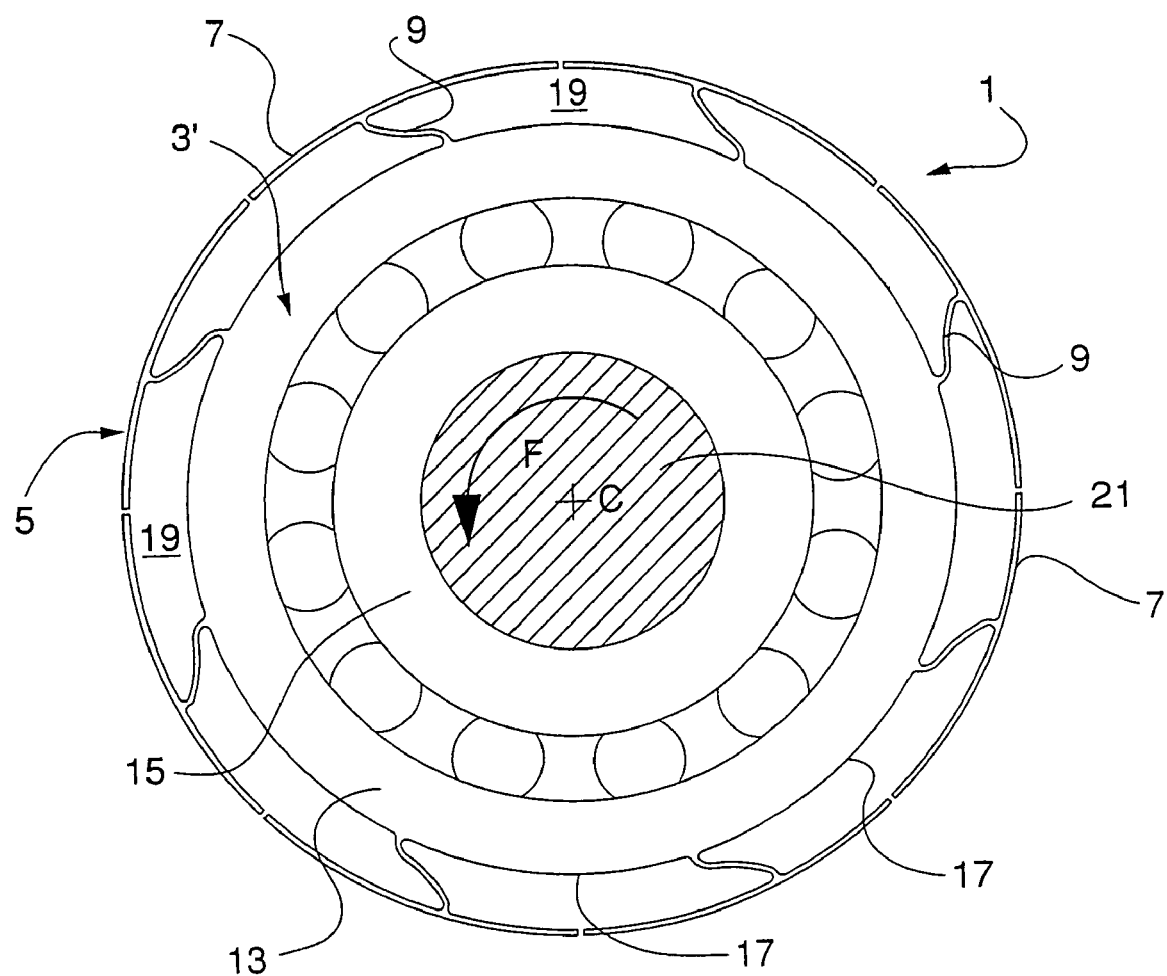
FIG. 3c is a plan view of a mounting arrangement of the support according to the invention, in a second preferred embodiment.

Similarly, in another embodiment of the support according to the invention, shown in FIG. 3c, solid shell 3' is integrated into the stationary outer ring of the bearing, while shoes 7 are turned to the outside and are in contact with the seat housing the bearing.

Also in this case the considerations made for the previous case disclosed with reference to FIG. 3a substantially apply.

It is evident that the annular support according to the invention attains the intended aims, since it allows effectively restraining the vibrations transmitted by the bearing the support is associated with, and allows considerably reducing the friction in axial direction. Advantageously, however, the annular support constructed in this manner allows attaining at the same time a high friction in tangential direction, thereby preventing any relative rotational movement between said annular support and the bearing or the shaft the support is associated with.

It is evident as well that the above description has been given only by way of non limiting example and that several changes are possible without departing from the scope of the invention.

What is claimed is:

1. A support (1) for rolling bearings (11) comprising:
   a pair of concentric cylindrical shells (3,5) connected together by a plurality of radial plates (9), at least one of said shells (3,5) being circumferentially broken by a plurality of slits (17) so as to define a plurality of shoes (7), each of said radial plates (9) being connected to a corresponding one of said shoes (7),
   wherein each of said plates (9) is connected to said shells (3,5) along generatrices lying in different planes ($P_1$, $P_2$) passing through a central axis (C) of said concentric cylindrical shells (3,5) and lying in a region intermediate between the slits (17) defining said corresponding shoe (7) and is connected to said respective shoe (7) along a generatrix lying in plane ($P_2$) arranged so as to define shoe portions or arcs ($A_1$, $A_2$) of different lengths.

2. The support as claimed in claim 1, wherein the inner cylindrical shell (5) is circumferentially broken as to defined said plurality of shoes (7), the outer cylindrical shell (3) being solid.

3. The support as claimed in claim 1, wherein the outer cylindrical shell (3) is circumferentially broken as to define said plurality of shoes (7), the inner cylindrical shell (5) being solid.

4. The support as claimed in claim 1, wherein said plates (9) are resilient allowing a radial displacement of said shoes (7).

5. The support as claimed in claim 1, wherein the shoes of said plurality are separated by equally spaced breaks.

6. The support as claimed in claim 1, wherein the shoes of said plurality are separated by breaks, which are formed by axial slits (17) parallel to the generatrices of said cylindrical shells (3, 5).

7. The support as claimed in claim 1, wherein said planes ($P_1$, $P_2$) with generatrices are arranged so that the length of the shoe arc ($A_3$) extending from the line of intersection with said first plane ($P_1$) to an end of said shoe (7) is substantially the same as that of the shoe arc ($A_2$) extending from the line of intersection with said second plane ($P_2$) to the opposite end of said shoe (7).

8. The support as claimed in claim 1, wherein said plates (9) are substantially "S" shaped.

9. The support as claimed in claim 1, further comprising a resilient material which is interposed between said shells (3,5).

10. The support as claimed in claim 9, wherein said resilient material is an elastomer such as rubber or a silicone compound.

11. A rolling bearing (11) having an outer first ring (13), an inner second ring (15) and a plurality of balls or rollers interposed between said rings (13,15), comprising:
    a cylindrical shell (3) concentric with said inner and outer rings and connected by means of a plurality of radial plates (9) to said first or second ring (13, 15), said shell (3) being broken by a plurality of slits (17) so as to define a plurality of shoes (7), each of said radial plates (9) being connected to one of said shoes wherein each of said plates (9) is connected to said shell (3) and to said first or second ring (13,15) along generatrices lying in different planes ($P_1$, $P_2$) passing through a central axis (C) of said rings (13,15) and lying in a region intermediate between the slits (17) defining said corresponding shoe (7) and is connected to said respective shoe (7) along a generatrix lying in plane ($P_2$) arranged so as to define shoe portions or arcs ($A_1, A_2$) of different lengths.

12. The support as claimed in claim 11, wherein said rings are made of metal.

13. The support as claimed in claim 11, wherein said ring are made of tempered steel.

14. A rotary vacuum pump comprising a rotating shaft (105) rotated by an electric motor (109) and supported by at least one rolling mechanical bearing (107a, 107b), said shaft being equipped with rotor discs (103) co-operating with stator rings for gas pumping, the pump and comprising:

a support ring (1) disposed between said rolling bearing (107a, 107b) and the corresponding seat (115) provided in said pump, and/or between said bearing (107a, 107b) and said shaft (105), said support ring comprising a pair of concentric cylindrical shells (3, 5) connected together by a plurality of radial plates (9), at least one of said shells (3, 5) being circumferentially broken so as to define a plurality of shoes (7), each of said radial plates (9) being connected to one of said shoes, wherein each of said plates (9) is connected to said shell (3) and to a first or second ring (13,15) along generatrices lying in different planes ($P_1, P_2$) passing through a central axis (C) of said rings (13, 15) and lying in a region intermediate between the slits (17) defining said corresponding shoe (7) and is connected to said respective shoe (7) along a generatrix lying in plane ($P_2$) arranged so as to define shoe portions or arcs ($A_1, A_2$).

15. The vacuum pump as claimed in claim 14, wherein said pump is a turbomolecular pump.

* * * * *